United States Patent
Wallner (10) Patent No.: US 9,864,985 B2
(45) Date of Patent: Jan. 9, 2018

(54) TRANSMITTER AND METHOD FOR SUBSTANTIALLY REDUCING DEAD ZONES IN AN INDUCTIVE CONTACTLESS MOBILE PAYMENT SYSTEM

(71) Applicant: LoopPay, Inc., Burlington, MA (US)

(72) Inventor: George Wallner, Miami Beach, FL (US)

(73) Assignee: SAMSUNG PAY, INC., Burlington, MA (US)

( * ) Notice: Subject to any disclaimer, the term of this patent is extended or adjusted under 35 U.S.C. 154(b) by 483 days.

(21) Appl. No.: 14/627,958

(22) Filed: Feb. 20, 2015

(65) Prior Publication Data

US 2016/0203472 A1 Jul. 14, 2016

Related U.S. Application Data (60) Provisional application No. 62/103,237, filed on Jan. 14, 2015.

(51) Int. Cl.
| | |
|---|---|
| G06K 19/06 | (2006.01) |
| G06Q 20/34 | (2012.01) |
| H01F 38/14 | (2006.01) |
| H04B 5/00 | (2006.01) |

(52) U.S. Cl.
CPC .......... *G06Q 20/341* (2013.01); *H01F 38/14* (2013.01); *H04B 5/0056* (2013.01); *H04B 5/0075* (2013.01); *H01F 2038/143* (2013.01)

(58) Field of Classification Search
CPC . G06Q 20/341; H01F 2038/143; H01F 38/14; H04B 5/0056; H04B 5/0075

USPC .......................................... 235/492, 493, 439
See application file for complete search history.

(56) References Cited

U.S. PATENT DOCUMENTS

| | | | |
|---|---|---|---|
| 6,206,293 B1 | 3/2001 | Gutman et al. | |
| 7,114,652 B2 | 10/2006 | Moullette et al. | |
| 7,892,858 B2* | 2/2011 | Liu | H01L 23/5227 257/E21.001 |
| 9,170,086 B1* | 10/2015 | Youngquist | G01B 7/14 |
| 2004/0212542 A1 | 10/2004 | Rahim | |
| 2007/0285255 A1 | 12/2007 | Tsushima et al. | |
| 2010/0176924 A1 | 7/2010 | Seitz et al. | |
| 2012/0249276 A1 | 10/2012 | Fontana et al. | |
| 2013/0256397 A1 | 10/2013 | Brown et al. | |

OTHER PUBLICATIONS

International Search Report from PCT/US2015/068277.

\* cited by examiner

*Primary Examiner* — Seung Lee
(74) *Attorney, Agent, or Firm* — Seyfarth Shaw LLP; Brian Michaelis (57) ABSTRACT

A transmitter to generate a signal to be read by a reader is described. The transmitter includes a driver circuit; and at least two inductors connected to the driver circuit. The driver circuit controls the current flow through the inductor and the current flow results in a signal such that the signal strength is above the detection limit of the reader for each of the inductors which may have at least one null region. Additionally, the inductors are positioned such that the null regions of the inductors do not overlap.

22 Claims, 13 Drawing Sheets

TRANSMITTER AND METHOD FOR SUBSTANTIALLY REDUCING DEAD ZONES IN AN INDUCTIVE CONTACTLESS MOBILE PAYMENT SYSTEM

RELATED APPLICATIONS

This application claims the benefit of the earlier filing date of U.S. Patent Application No. 62/103,237, filed on Jan. 14, 2015, the contents of which are incorporated by reference herein in its entirety.

BACKGROUND

Transmission of magnetic stripe data has been done primarily by swiping a magnetic stripe card against a magnetic stripe reader (MSR) to enable payment, identification (ID), and access control functions. Mobile wallet applications on smartphones and tablets have had difficulty interacting with existing merchant point of sale (POS) devices or other devices with MSRs. Contactless reader enabled POS terminals (typically using, for example, an ISO-14443 standard) are not ubiquitous to accept contactless or near field communications (NFC) payments. It would be expensive and would take time to replace the millions of merchant POS devices (or door locks) that only accept magnetic stripe cards, just to interact with NFC phones or other transmission means like barcodes.

In recent years devices, systems, and methods have been developed that included a magnetic stripe capture, storage and transmission device for use in conjunction with a mobile wallet application to capture, store and transmit magnetic stripe card data to merchants' conventional point of sale (POS) terminals and other devices with magnetic stripe readers (MSRs) or checkout systems, in physical and virtual environments. These systems provide a convenient payment experience for consumers, a secure transaction for merchants, and in some cases additional data to be transmitted to a MSR for the purpose of loyalty, identification (ID), or access control.

One system developed by LoopPay Inc of Burlington, Mass. for securely capturing, storing and transmitting magnetic stripe payment card data includes a mobile communication device and mobile application, and a magnetic stripe transporter dongle. The magnetic stripe transporter dongle includes a microprocessor, magnetic field transmitter which includes a driver and an inductor that can generate varying magnetic fields, a battery, a charging circuit, a magnetic stripe reader (MSR), a memory means or secure element, an audio jack interface, and a communication interface (for example, a USB interface, a 30pin or 9pin Apple interface, a Bluetooth interface, etc.) working in conjunction with a consumer mobile device and wallet application for capturing magnetic stripe card data, storing the data securely, and transmitting such data to merchants' point of sale (POS) or checkout systems, in the physical and virtual environments.

Figure 1:
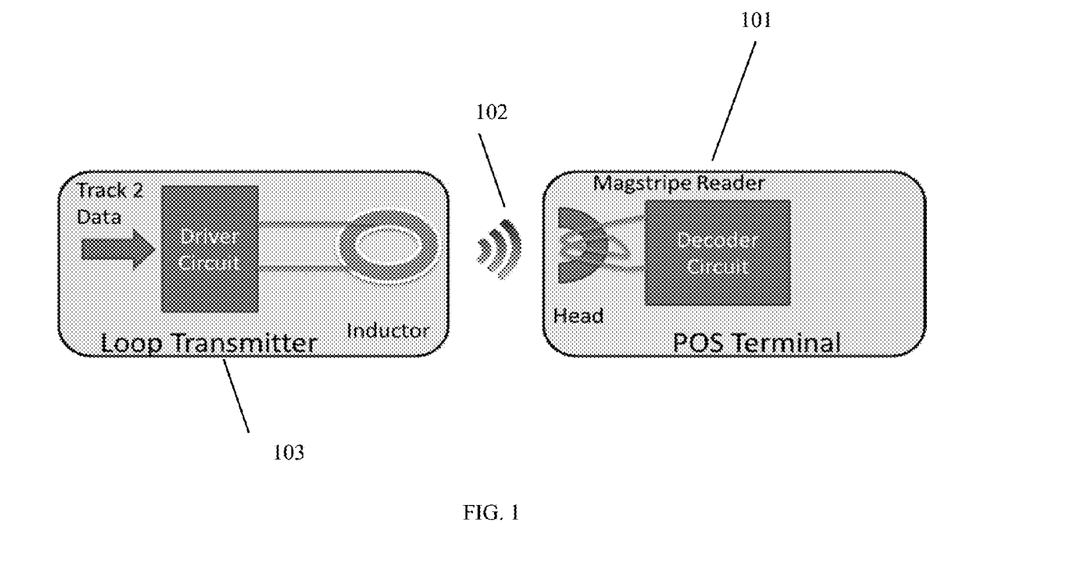
FIG. 1 shows a schematic of Magnetic Secure Transmission (MST) system utilized in the present invention.

The Magnetic Secure Transmission (MST) technique magnetically couples simulated magnetic stripe data into a POS magnetic stripe reader (MSR) 101 from a distance of 30 to 40 mm. An alternating polarity magnetic field 102 is generated by driving alternating polarity current through a suitably designed inductor. The MSR head, which contains an inductor, picks up the magnetic pulses and converts them to voltage pulses, which in turn are decoded by the reader circuit and terminal logic. This is schematically shown in FIG. 1.

However, in real life, inductors, including NFC inductors, do not have isotropic fields. Flat inductors, for example, tend to have doughnut shaped fields. Other inductors generate different field shapes.

The overlapping field patterns of the MST transmitter inductor and the reader head inductor result in one or more nulls: narrow areas where no signal transfer takes place. Depending on the inductor topology, these nulls can be either on the center-line of the reader head, or along the edges off to the sides. Nulls affect the reliability of card data transmissions. While users quickly learn in which position their LoopPay device works best, some inconvenience and the need for two or three tries results at times. When MST is integrated into a smart-phone, which is larger than a LoopPay device, precise placement is less likely and therefore first-time MST transmission success rate suffers.

SUMMARY OF INVENTION

In an aspect, a transmitter to generate a signal to be read by a reader is described. The transmitter includes a driver circuit; and at least two inductors connected to the driver circuit. The driver circuit controls the current flow through the inductor and the current flow results in a signal such that the signal strength is above the detection limit of the reader for each of the inductors which may have at least one null region. Additionally, the inductors are positioned such that the null regions of the inductors do not overlap.

In some embodiments, the inductors are positioned to produce regions where the signal strength is greater than the detection limit of the reader to result in good data read.

In some embodiments, the transmitter has only two inductors.

In some embodiments, the transmitter has at least one inductor that is an L-mode inductor and in other embodiments, the transmitter has at least one inductor that is an X-mode inductor.

In some embodiments, the L-mode inductor further comprises a conductive material. The conductive material may be selected from a group consisting of a metal wire, a printed circuit board, and stamped sheet metal shapes. The conductive material maybe plated or coated with a material selected from a group consisting of enamel, acrylic or plastic. In yet other embodiments, the conductive material is shaped in the form selected from the group consisting of irregular, circle, polygon, rectangle, square, and triangle.

In some embodiments, the X-mode inductor further comprises a core, which may be made of ferrite. In some other embodiments, the core has a cross-sectional shape selected from the group consisting of irregular, circle, polygon, rectangle, square, and triangle.

In some embodiments, at least one inductor is an L-mode inductor and at least one inductor is an X-mode inductor. In other embodiments, all the inductors are L-mode inductors or, all the inductors are X-mode inductors.

In some embodiments, at least one inductor does not have its null region, where the signal strength is below the detection limit of the reader, positioned above the reader.

In some embodiments, the regions of the inductors where the signal strength is greater than the detection limit of the reader are contiguous and increase the total area where the signal strength is greater than reader detection limit. In some embodiments, the driver circuit flows the current through multiple inductors at the same time. In other embodiments, the driver circuit flows the current through multiple inductors at the separate times.

In another aspect, a method of driving a transmitter is described that includes a driver circuit and at least two inductors connected to the driver circuit with each inductor having at least one null region with a signal strength below the detection limit of a signal reader, wherein the driver circuit controls the current flow through the inductor that results in a signal, said method includes the steps of:

(a) positioning the at least two inductors in the transmitter so that the null regions of the inductors do not overlap; and (b) flowing current through the at least two inductors to generate a composite signal.

In some embodiments, the method of driving the transmitter includes, flowing current through only one inductor at a given time. In some other embodiments, the composite signal has a null region wherein the signal strength is below the detection limit of the reader. In some embodiments, the composite signal has a signal strength skewed towards one side of the reader. In some embodiments, the null region of the composite signal is located at a unique location with no overlap with the null regions of the individual inductors of the transmitter.

In some embodiments, the method of driving the transmitter includes the step of flowing current through the at least two inductors. The flowing of the current further includes alternating between flowing current through a plurality of the inductors at a given time and flowing current through only one inductor at a given time. In some embodiments, the step of flowing current through the at least two inductors includes having the current flow in the same direction through all the inductors. In some other embodiments, the step of flowing current through the at least two inductors includes having at least one inductor having the current flow in the opposite direction as compared with all the other inductors.

In an aspect the transmitter includes a single inductor connected to a driver circuit. The driver circuit controls the current flowing through the inductor resulting in a transmission and the driver circuit passes the current through the inductor multiple times while the inductor is moved relative to a card reader head passing through a number of positions. At at least one of the number of positions the inductor passes through, the inductor produces a transmission signal that is greater than the card reader threshold for a good data read.

In an aspect, the method includes passing current multiple times, controlled by a driver circuit, through a transmitter including a single inductor to produce a signal for transmission while the inductor is moved relative to a card reader head passing through a number of positions. At at least one of the number of positions the inductor passes through, the inductor produces a transmission signal that is greater than the card reader threshold for a good data read.

BRIEF DESCRIPTION OF DRAWINGS

The following Figures are provided for the purpose of illustration only and are not intended to be limiting.

FIGS. 5 A and 5 B shows two examples of an L-mode inductor used in the transmitter of FIG. 2 where the copper wire is used as the conductive material and is wound in a rectangular shape.

FIGS. 6 A and 6 B shows two examples of an X-mode inductor used in the transmitter of FIG. 2 where copper wire is used as an the conductive material and the core has a circular cross-section and a rectangular cross-section, respectively.

FIG. 7 A shows an embodiment of the present invention with the transmitter shown in FIG. 2 including three inductors where one inductor is an L-mode inductor and the other two inductors are X-mode inductors.

FIG. 7 B shows an embodiment of the present invention with the transmitter shown in FIG. 2 including two inductors where both the inductors are L-mode inductors.

FIG. 7 C shows an embodiment of the present invention the transmitter shown in FIG. 2 including with two inductors where both the inductors are X-mode inductors.

FIG. 12 A shows an example of positive phasing with the current flowing in the transmitter of FIG. 2 in the same direction for both inductor A and B.

FIG. 12 B shows an example of negative phasing with the current flowing in the transmitter of FIG. 2 in the opposite direction for both inductors A and B.

DETAILED DESCRIPTION

Figure 2:
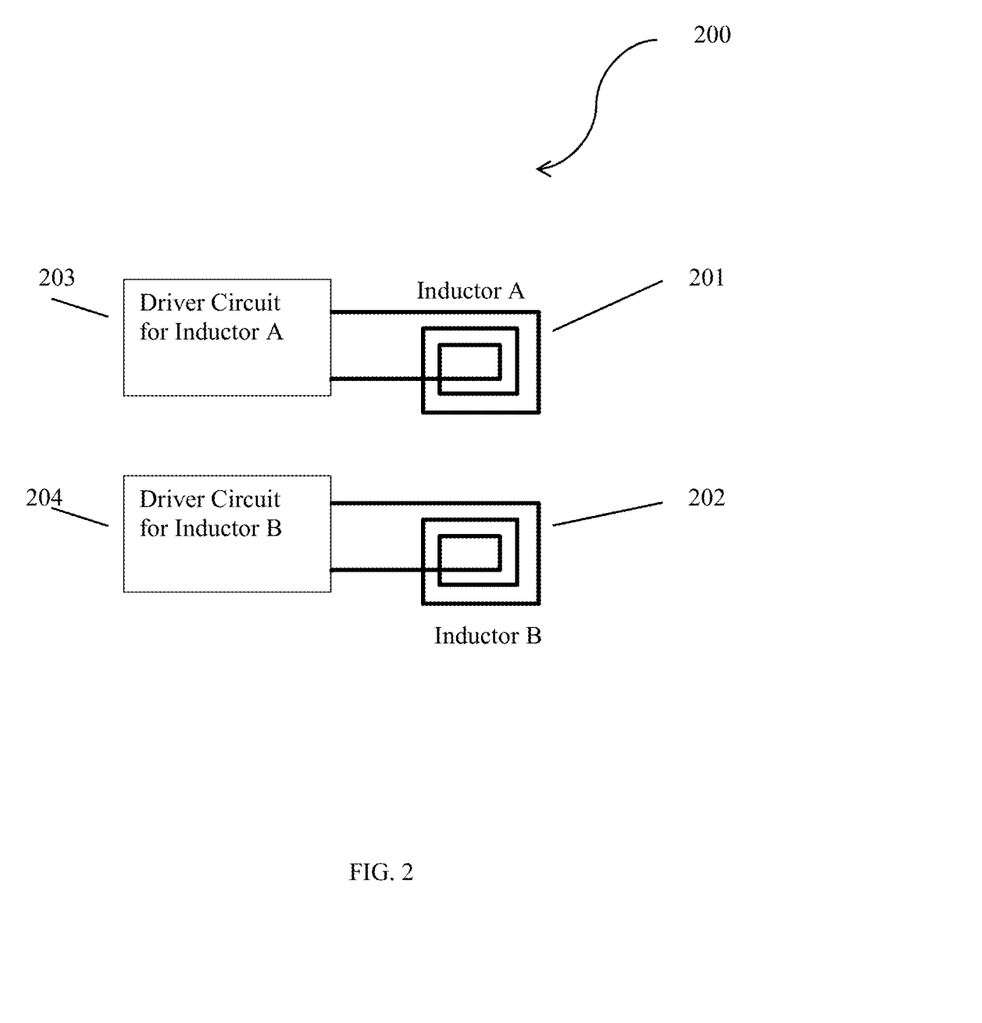
FIG. 2 shows a schematic of the transmitter according to the present invention.

A transmitter 200 to generate a signal to be read by a reader is described. The transmitter 200 includes a driver circuit; and at least two inductors, 201 and 202, connected to the driver circuit 203 and 204, respectively. The driver circuit controls the current flow through the inductors and the current flows result in a magnetic fields. The magnetic fields include areas where the signal strength is below the detection limit of the reader for each of the inductors, 201 and 202, which forms at least one null region. Additionally, the inductors, 201 and 202, are positioned such that the null regions of the inductors do not overlap.

FIG. 2 shows a schematic of the transmitter 200 according to the present invention. Inductor A 201 and Inductor B 202 are driven by driver circuits A 203 and 204, respectively.

Figure 3:
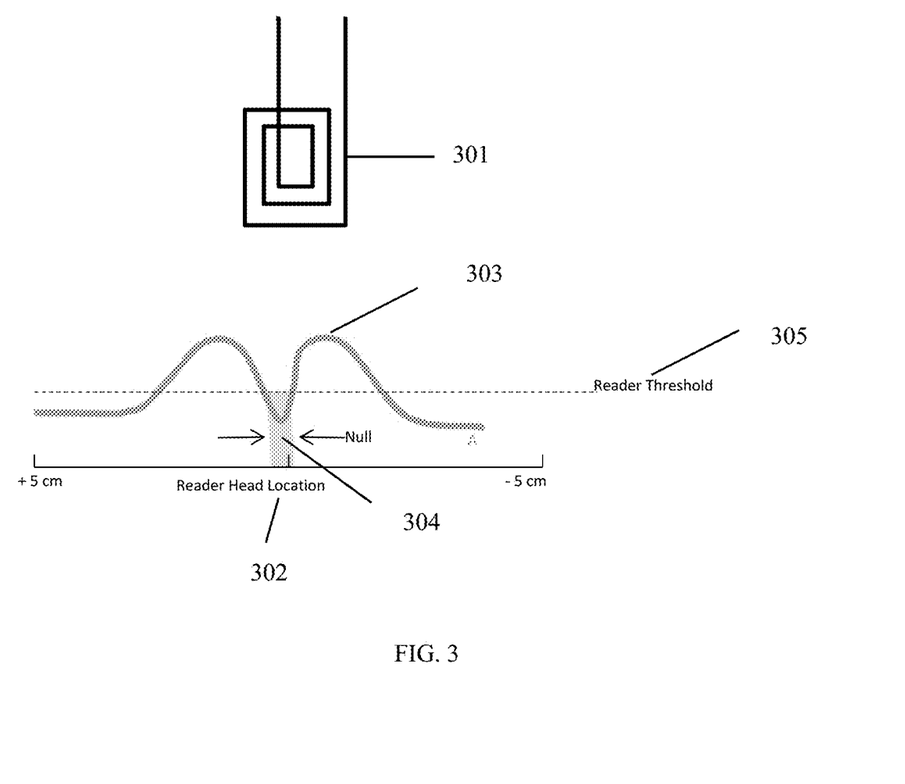
FIG. 3 shows a schematic of the voltages induced by a flat, horizontal inductor into a typical POS terminal's card reader-head from different relative positions along the card reader swipe slot.

The voltages induced by a flat, horizontal inductor 301 into a typical POS terminal's card reader-head 302 from different relative positions along the card reader swipe slot, is shown in FIG. 3. Signal transfer 303 on either side of the head 302 is strong but it diminishes closer to the center of the head 302 and becomes zero right over the head's center. A null region 304 forms in the area where the induced signal is below the reader threshold 305. The null regions can be 5 to 20 mm wide. When the user holds the MST device in the null region transmissions often fail, requiring a second or third attempt to get a good read.

The width of the null depends on the size of the inductor, the intensity of the inductor current and the sensitivity of the POS card reader. The null can be made narrower by driving more current through the inductor but it cannot be completely eliminated, although with proper inductor design it can be made small enough to have less impact on use.

Figure 4:
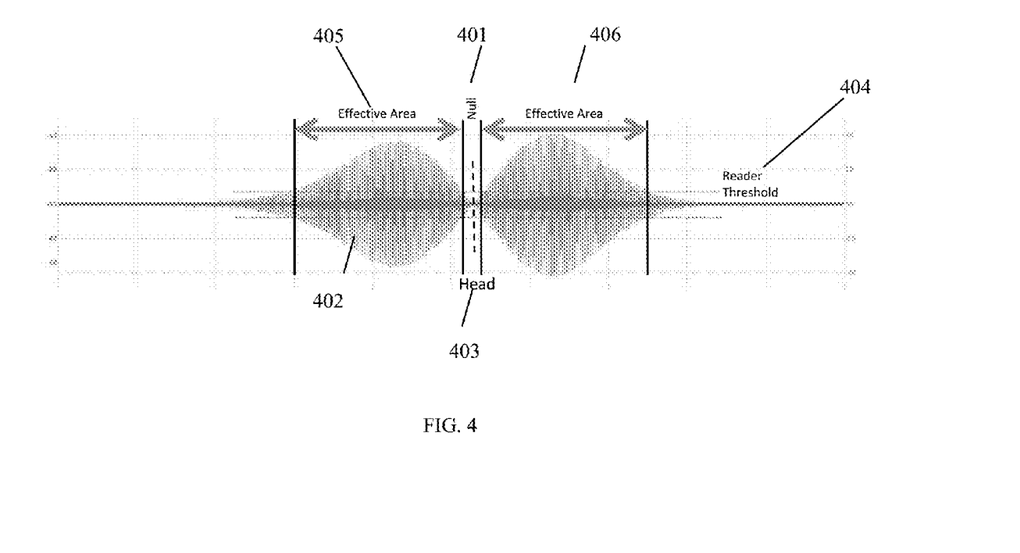
FIG. 4 shows the mutual magnetic coupling between the MST transmitter inductor shown in FIG. 2 and the magnetic stripe reader head inductor to transfer simulated track data to the POS terminal 403 where the coupling is very low or zero 401 and the reader threshold below which transmissions fail.

MST uses mutual magnetic coupling between the MST transmitter inductor 301 and the magnetic stripe reader head inductor 302 to transfer simulated track data to the POS terminal. Coupling between inductors is influenced by their physical properties and relative positions. There are certain relative positions of the inductors where the coupling is very low or zero. These locations, called nulls, effect reliability and cause users to try transmissions a number of times. Similar problems also plague applications using NFC chips. The method of the present invention is capable of working with NFC transmitters to successfully eliminate NFC inductor null regions.

FIG. 4 shows the null region 401 from an analog test, where the same inductor is continuously feed with a square wave and is moved along the card reader slot (x axis) while the signal level 402 picked up by the reader head 403 is displayed on the Y axis. At the left extreme the inductor is too far from the head to produce a detectable signal. As the inductor is moved towards the reader head (center) the signal first increases and peaks at about 2 cm from the head. As the inductor keeps moving and gets closer to the head, the signal drops below the reader threshold 404 to form the first effective area 405. While continuing to move forward towards the right, the signal level 402 drops further and becomes zero at the center of the head 403. The signal level 402 starts increasing again as the inductor is moved away from the head 403 (to the right). A second effective area 406 is subsequently generated where the signal level 402 is above the reader threshold 404. Between the two effective areas is a null. Each effective area is about 4 cm wide.

Figure 5A:
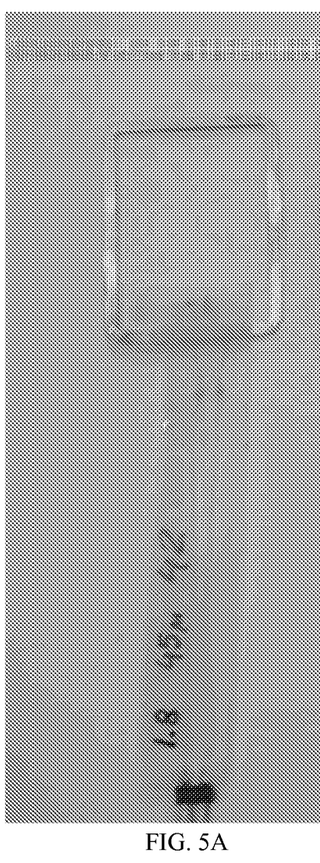
Figure 5B:
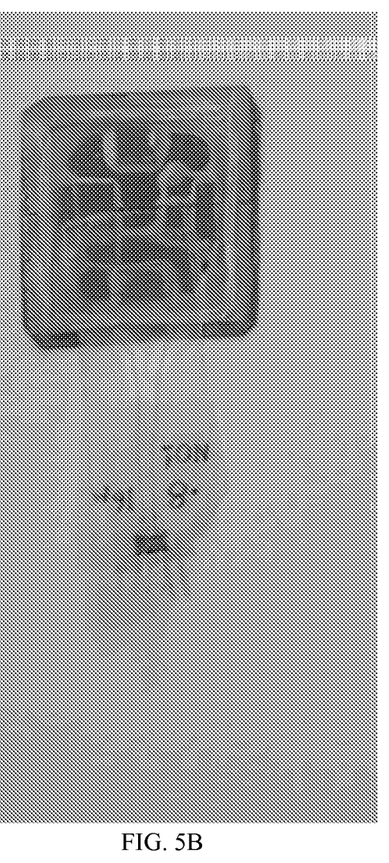

The inductor of the transmitter is an L-mode inductor, and the L-mode inductor may include a conductive material. The conductive material is selected from a group consisting of a metal wire, a printed circuit board, and stamped sheet metal shapes. The conductive material may also be plated. In some other embodiments, the conductive material is coated with a material selected from a group consisting of enamel, acrylic or plastic. In yet other embodiments, the conductive material is shaped in the form selected from the group consisting of irregular, circle, polygon, rectangle, square, and triangle. FIGS. 5 A and 5 B shows two examples of an L-mode inductor where the copper wire is used as the conductive material and is wound in a rectangular shape.

Figure 6A:
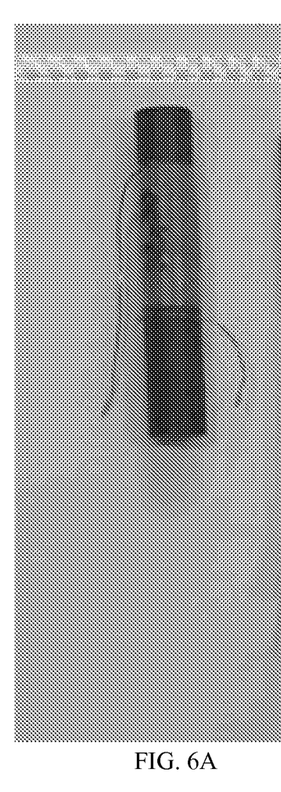
Figure 6B:
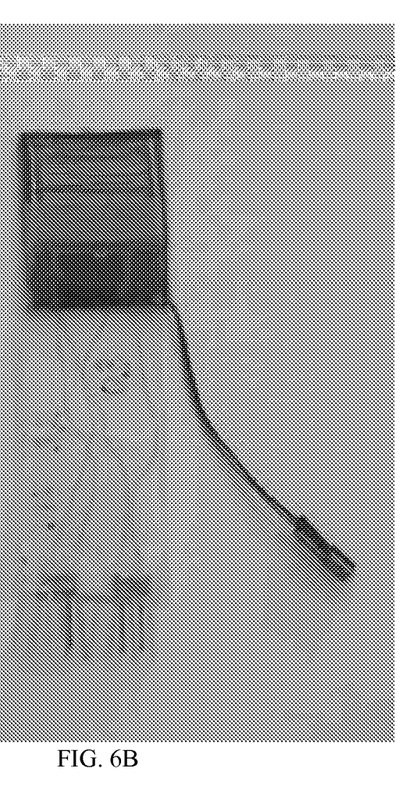

In some embodiments of the transmitter, at least one inductor is an X-mode inductor. The X-mode inductor may include a core, which may be made of ferrite. In some embodiments, the core has a cross-sectional shape selected from the group consisting of irregular, circle, polygon, rectangle, square, and triangle. FIGS. 6 A and 6 B shows two examples of an X-mode inductor where the copper wire is used as the conductive material and the core has a circular cross-section and a rectangular cross-section, respectively.

Figure 7A:
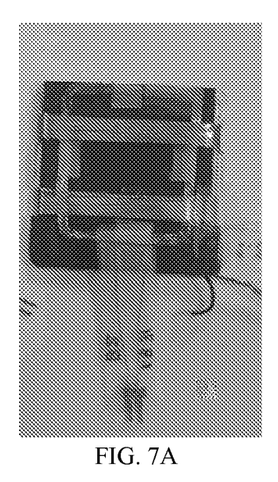
Figure 7B:
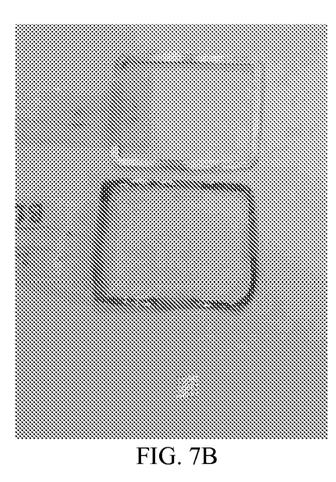
Figure 7C:
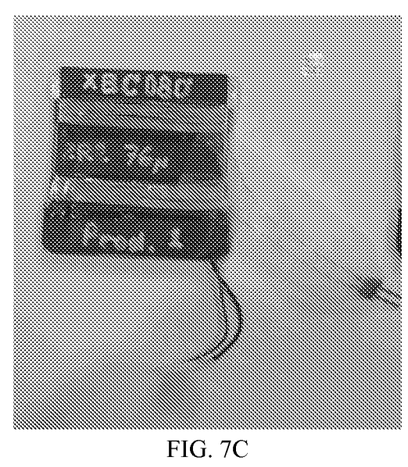

In some embodiments, at least one inductor is an L-mode inductor and at least one inductor is an X-mode inductor. FIG. 7 A shows an embodiment with three inductors, where one inductor is an L-mode inductor and the other inductors are X-mode inductors. When the transmitter has only two inductors, one inductor may be an L-mode inductor and the other inductor may be an X-mode inductor. In other embodiments, all the inductors are L-mode inductors. FIG. 7 B shows an embodiment with two inductors where both the inductors are L-mode inductors. All of the inductors may also be X-mode inductors. FIG. 7 C shows an embodiment with two inductors where both the inductors are X-mode inductors.

Figure 8:
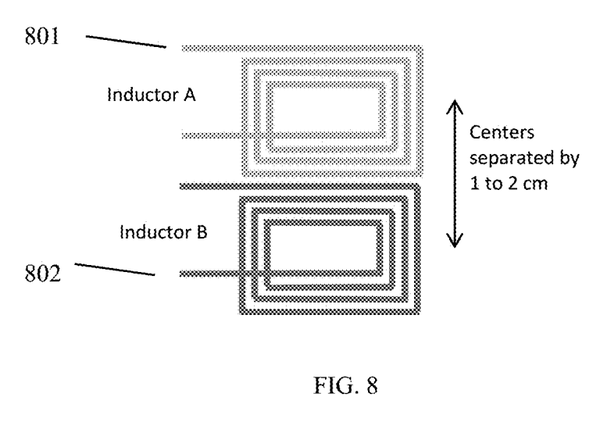
FIG. 8 shows a schematic of an eccentric inductor utilized in the transmitter shown in FIG. 2 where the centers of the Inductors are separated by 1 to 2 cm.
Figure 9:
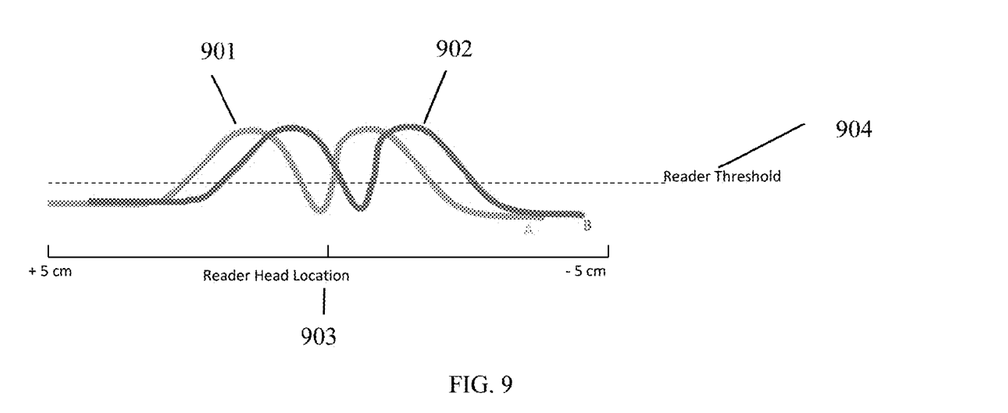
FIG. 9 shows the schematic of the two induced signal levels 901 and 902 of the two inductors A and B whose centers are offset.

In an embodiment, the transmitter includes two eccentric inductors A and B that are driven separately or together. FIG. 8 shows a schematic of an eccentric inductor where the centers of the Inductor A 801 and B 802 are separated by 1 to 2 cm. FIG. 9 shows the schematic of the two induced signal levels 901 and 902 corresponding to the two inductors A 801 and B 802 whose centers are offset upon interaction with the reader head 903. The offset centers of the inductors result in the nulls, where the signal levels 901 and 902 drop below the reader threshold 904, for the respective inductors 801 and 802 to be offset.

The inductors with non-overlapping nulls can be used in two ways:
1) Individually, where the inductors are used at different times to transmit the same card data; if one inductor is in a null region and is not read by the reader, at least one other inductor, whose null is offset, will be read.
2) Combined, where the inductors are fed properly phased currents to create a composite field and a pattern where the fields of the inductors re-enforce each other in a desired direction and cancel in the other direction.

Figure 10:
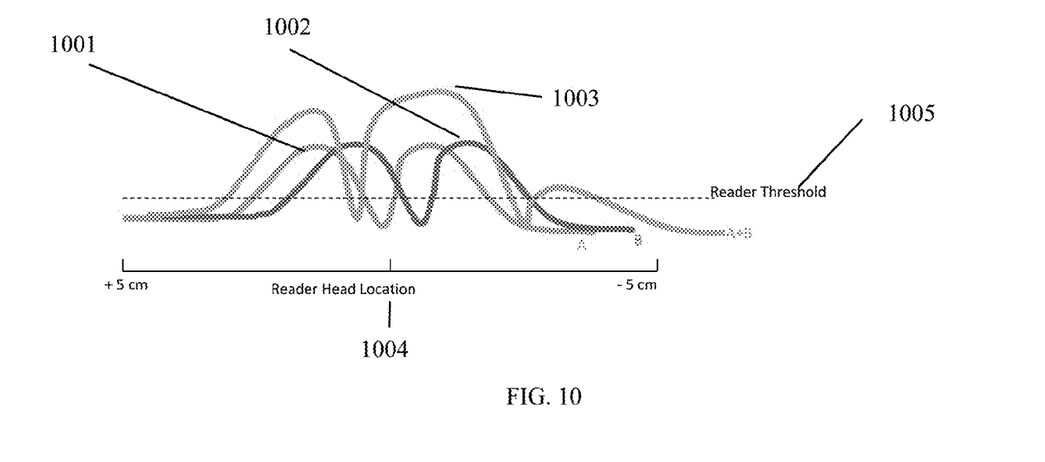
FIG. 10 shows three signal patterns possible with two inductors used in the transmitter of FIG. 2 when used individually, or in combination.

FIG. 10 shows three of the signal patterns possible with two inductors when used individually and in combination. The individual and combined shapes of signals from inductors A and B, respectively, offset by approximately 1 cm, are shown by lines A 1001 and B 1002.

The curve A+B 1003 shows the signal from inductor A+B combination, with proper phasing. It can be seen that the field generated by the combination of signal A+B is significantly stronger field on one side. This is normally configured to be towards the POS reader 1004. The reader threshold 1005 is also shown in the FIG. 10.

Figure 11:
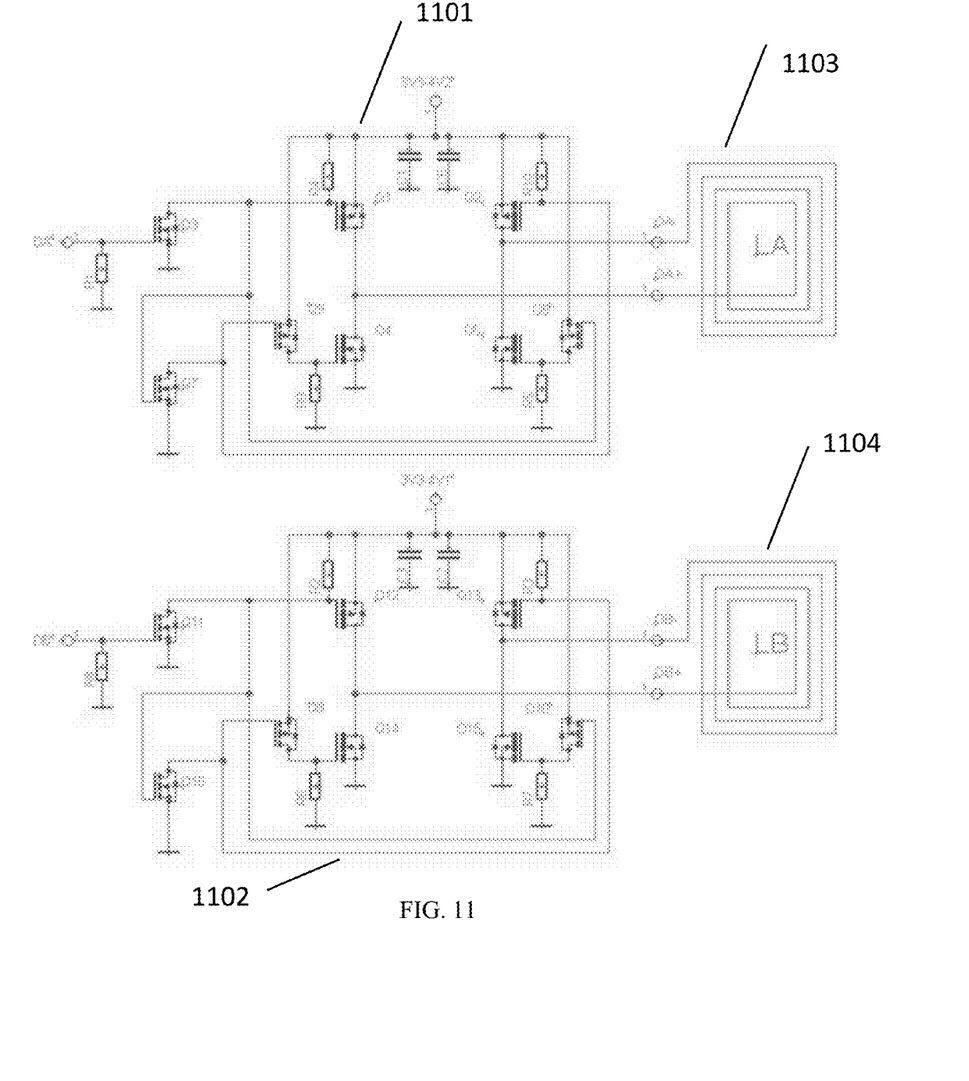
FIG. 11 shows an H bride drive that can be used to drive the current flow through the inductors.

FIG. 11 shows an H bride drive A and B 1101 and 1102 that can be used to drive the current flow through the inductors A 1103 and B 1104. One skilled in the art would understand that other drivers to control the current flow in the circuitry may be used alternatively.

Figure 12:
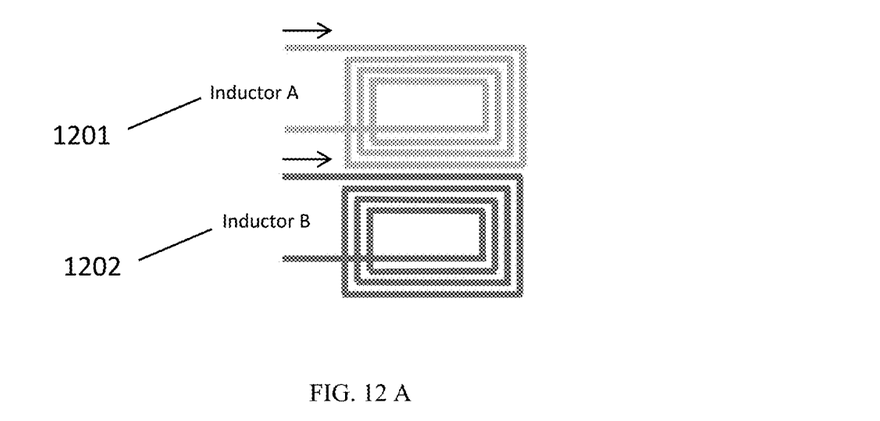

In some embodiments, the step of flowing current through the at least two inductors includes having the current flow in the same direction through all the inductors. This is called positive phasing. In some other embodiments, the step of flowing current through the al least two inductors includes having at least one inductor having the current flow in the opposite direction as compared with all the other inductors. This is called negative phasing. FIG. 12 A shows an example of positive phasing with the current flowing in the same direction for both inductor A 1201 and B 1202. FIG. 12 B shows an example of negative phasing with the current flowing in the opposite direction for both inductors A 1201 and B 1202.

Figure 13:
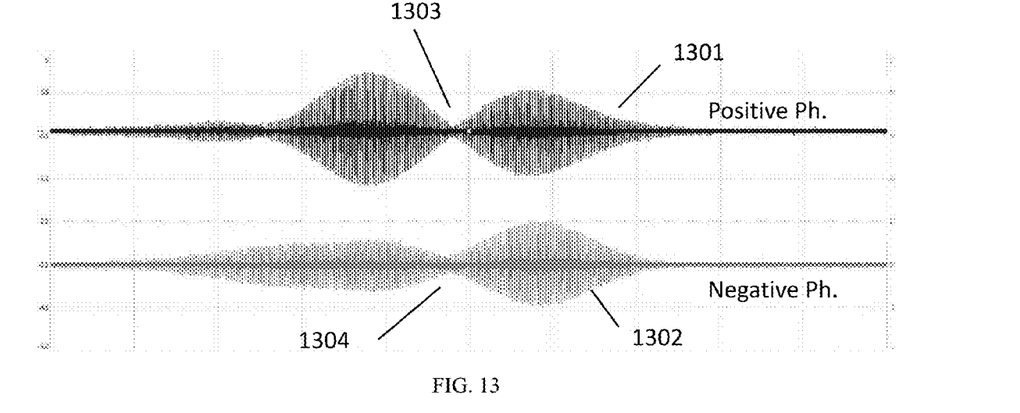
FIG. 13 shows the composite field shapes of inductors A and B used in the transmitter of FIG. 2 with positive phasing and negative phasing.

FIG. 13 shows the composite field shapes of inductors A 1201 and B 1202 with positive phasing 1301 and negative phasing 1302. FIG. 13 shows that the positive phasing produces a stronger magnetic field, while negative phasing produces a wider field. The null 1303 in the positive phasing mode is located at a different place than the null of either inductor A or B. It is noteworthy that while positive phasing will always have a null, negative phasing can make the null 1304 less deep, as shown in FIG. 13. In fact the null can be eliminated by adjusting the inductor current using a series resistor. However, the trade-off while eliminating the null in negative phasing is a weaker signal in the rest of the pattern.

The transmitter of the present invention uses at least two inductors with multiple transmissions that eliminate the effects of inductor nulls. The two inductors can be used either separately or at the same time. When used at the same time, the inductors are phased to create a composite magnetic field, which further increases diversity by moving the nulls and by increasing the effective area.

In an aspect the transmitter includes a single inductor connected to a driver circuit. The driver circuit controls the current flowing through the inductor resulting in a transmission and the driver circuit passes the current through the inductor multiple times while the inductor is moved relative to a card reader head passing through a number of positions. In at least one of the number of positions the inductor passes through, the inductor produces a transmission signal that is greater than the card reader threshold for a good data read.

In an aspect, the method includes passing current multiple times, controlled by a driver circuit, through a transmitter including a single inductor to produce a signal for transmission while the inductor is moved relative to a card reader head passing through a number of positions. In at least one of the number of positions the inductor passes through, the inductor produces a transmission signal that is greater than the card reader threshold for a good data read.

Those skilled in the art would readily appreciate that all parameters and configurations described herein are meant to be exemplary and that actual parameters and configurations will depend upon the specific application for which the systems and methods of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that the invention may be practiced otherwise than as specifically described. The present invention is directed to each individual feature, system, or method described herein. In addition, any combination of two or more such features, systems or methods, if such features, systems or methods are not mutually inconsistent, is included within the scope of the present invention.

What is claimed:

1. A transmitter to generate a signal to be read by a reader, comprising:
   a driver circuit; and
   at least two inductors connected to the driver circuit;
   wherein the driver circuit controls a flow of current through the at least two inductors that results in a signal;
   wherein, along an axis while the current flows through, each inductor has two effective areas where a signal strength is greater than a detection limit of the reader and a null region there between, where the signal strength is below the detection limit of the reader; and
   wherein the inductors are positioned such that, along the axis, the null regions of the at least two inductors do not overlap, and the effective areas overlap along the axis, a total contiguous area of the signal along the axis having the signal strength being greater than any one of the effective areas and greater than the detection limit.

2. The transmitter of claim 1, wherein the at least two inductors are only two inductors.

3. The transmitter of claim 1, wherein at least one inductor of the at least two inductors is an L-mode inductor.

4. The transmitter of claim 1, wherein at least one inductor of the at least two inductors is an X-mode inductor.

5. The transmitter of claim 4, wherein the X-mode inductor comprises a core.

6. The transmitter of claim 5, wherein the core is made of ferrite.

7. The transmitter of claim 5, wherein the core has a cross-sectional shape selected from the group consisting of irregular, circle, polygon, rectangle, square, and triangle.

8. The transmitter of claim 1, wherein an inductor of the at least two inductors comprises a conductive material selected from a group consisting of a metal wire, a printed circuit board, and stamped sheet metal shapes.

9. The transmitter of claim 1, wherein an inductor of the at least two inductors comprises a plated conductive material.

10. The transmitter of claim 1, wherein an inductor of the at least two inductors comprises a conductive material coated with a material selected from a group consisting of enamel, acrylic or plastic.

11. The transmitter of claim 1, wherein each inductor of the at least two inductors comprises a conductive material shaped in the form selected from the group consisting of irregular, circle, polygon, rectangle, square, and triangle.

12. The transmitter of claim 1, wherein a first inductor of the at least two inductors is an L-mode inductor and a second inductor of the at least two inductors is an X-mode inductor.

13. The transmitter of claim 1, wherein each inductor of the at least two inductors is an L-mode inductor.

14. The transmitter of claim 1, wherein each inductor of the at least two inductors is an X-mode inductor.

15. The transmitter of claim 1, wherein the driver circuit flows the current through the at least two inductors at the same time.

16. The transmitter of claim 1, wherein the driver circuit flows the current through the at least two inductors at the separate times.

17. A method of driving the transmitter of claim 1, comprising flowing current through only one inductor of the at least two inductors at a time.

18. A method of transmitting a signal to a signal reader, the method comprising:
   providing a transmitter configured to transmit the signal to the signal reader, the transmitter comprising a driver circuit and at least two inductors connected to the driver circuit, wherein each inductor of the at least two inductors has, when driven, two effective areas where a signal strength is greater than that of a null region between the effective areas, and wherein the null regions of the at least two inductors do not overlap along an axis;
   positioning the at least two inductors of the transmitter near the signal reader; and
   flowing current, by the driver circuit, through the at least two inductors to generate a composite signal,
   wherein while the current flows through while positioned near the transmitter, each of the effective areas has a signal strength that is greater than a detection limit of the signal reader and each of the null regions has a signal strength that is below the detection limit, and
   the effective areas overlap along the axis to form the composite signal, a total contiguous area of the composite signal along the axis having the signal strength being greater than any one of the effective areas and greater than the detection limit.

19. The method of claim 18, wherein the composite signal has a signal strength skewed towards one side of the signal reader.

20. The method of claim 18, wherein the step of flowing current through the at least two inductors comprises alternating between flowing current through the at least two inductors at a given time and flowing current through only one of the at least two inductor at a time.

21. The method of claim 18, wherein the step of flowing current through the at least two inductors comprises having the current flow in a same direction through all of the inductors of the at least two inductors.

22. The method of claim 18, wherein the step of flowing current through the at least two inductors comprises having the current flow through a first inductor of the at least two inductors having the current flow in an opposite direction as compared with a second inductor of the at least two inductors.

* * * * *